AUTOMATIC TELEPHONE SYSTEMS AND THE LIKE

Filed Jan. 24, 1957 4 Sheets-Sheet 1

AUTOMATIC TELEPHONE SYSTEMS AND THE LIKE

Filed Jan. 24, 1957 4 Sheets-Sheet 2

July 28, 1959 J. E. FLOOD ET AL 2,897,281

AUTOMATIC TELEPHONE SYSTEMS AND THE LIKE

Filed Jan. 24, 1957 4 Sheets-Sheet 3

United States Patent Office 2,897,281
Patented July 28, 1959

2,897,281

AUTOMATIC TELEPHONE SYSTEMS AND THE LIKE

John Edward Flood and Ronald Sydney Hopkins, London, England, assignors, by mesne assignments, to Siemens Edison Swan Limited, London, England, a British company Application January 24, 1957, Serial No. 636,192

Claims priority, application Great Britain January 24, 1956

13 Claims. (Cl. 179—18)

This invention relates to automatic telephone exchange systems and the like, in particular to so-called translators as used in such systems for translating a "code" of digits identifying a called exchange into a further code, not necessarily always different from the first, appropriate to the setting up of a route or channel to that exchange and possibly also to the control of other functions such for instance as metering the call. The exchange identification code is received by a "register" by which it is sent to the translator, whence the translation is passed to a "sender" by which the appropriate route is set up and any other functions controlled. The functions of the register and sender are often combined in a so-called register-sender, but this latter term will be used in the following to denote either equipment performing both register and sender functions or simply a combination of register and sender in which each performs its own function. The number required on the called exchange, also identified by a series of digits following those of the exchange identification code, is usually transmitted directly by the register-sender, namely without translation.

As will appear hereinafter, the present invention contemplates using as a translator which may be common to, but separate from, a group of register-senders a continuously operable information storage device of the kind in which information is stored in digital form in a magnetic or other suitable storage medium capable of assuming a readily detectable condition variable in accordance with such information storage of the information being effected along one or more continuous tracks on the device by selective variation of said condition in unit areas of the recording medium each corresponding to one digit of information. Information to be stored is "written" on to such a device by means of so-called writing heads of which at least one is provided per track. Likewise the stored information can be "read" from the drum by means of so-called reading heads, again at least one per track, which may be separate from the writing heads or, where it is not required to write and read information simultaneously, may in suitable circumstances be constituted by heads capable of fulfilling both functions.

It is at present expected that the storage device employed will be in the form of a drum, or equivalently of a disc or continuous tape, having at least its operative surface constituted by a magnetic storage medium, storage of digital information being by selective magnetisation of unit areas of the surface. For such a magnetic storage drum or equivalent each reading and/or writing head associated therewith will essentially comprise a small magnetic element defining a magnetic circuit including an air gap and having a small coil linked therewith, the head being in use positioned with the air gap close to the drum surface. For writing, the coil is appropriately energised and the fringing magnetic field induced across the gap correspondingly magnetises the area of the drum surface instantaneously opposite the gap. When reading, the field produced by the area of the magnetised drum surface instantaneously opposite the gap induces a corresponding flux in the magnetic circuit of the head and results in a corresponding output being obtained from the coil.

In our copending application No. 623,669 of 1956 it is proposed to provide for an automatic telephone or like exchange translating equipment comprising a storage device of the kind set forth above at different "addresses" on which translations corresponding to different exchange codes can be stored in digital form, means for receiving from a register-sender a code for which translation is required, and means responsive to such code for selecting the address on the storage device at which the appropriate translation is stored and sending the translation back to the register-sender.

By an address on the storage device is meant that portion of its surface area which includes all the unit areas corresponding to the digits constituting a particular translation. In the translating equipment according to said copending application, the digits for each translation may be stored in either serial or parallel form; the present invention is concerned with the serial form of storage, that is, the digits which make up any one translation are stored in successive unit areas along one and the same track and the address of such translation is the sector of the track which embraces these unit areas. With the translations thus stored in serial form the digits of each, when called for, appear sequentially at the output of one and the same reading head.

It is envisaged that the translating equipment described in our said copending application will be most advantageously employed where exchange codes to be translated consist of not more than three decimal digits. There may be circumstances however in which more than three digits may be required to identify a particular exchange. For example, in automatic exchange systems in which both calls between exchanges in different areas and calls between exchanges in the same area are to be capable of being set up by a caller without intervention of an exchange operator, that is, the caller dials all the code and numerical digits appropriate to identifying the called exchange and number irrespective of whether it is a so-called local call or trunk call, the coding scheme employed for identifying the various exchanges according to the areas in which they lie may require an identification code of up to six digits for any particular exchange. Thus, for example, the territory over which such a system is in use may be divided up into a number of areas each identified by a code of three digits and including a number of exchanges also identified by three-digit codes, each exchange therefore being fully identified by a six-digit code. For dialling a call to an exchange in the same area only the three-digit exchange code need precede the called subscriber's number and a translator would only require to handle these three digits. Likewise in the case of a call to a different area, only the three digits of the area code would need to be translated to route the call to the switching centre of that area. In the case of a call to an adjacent area, however, there may be a direct route over which the calling and called exchanges could be connected without passing through the switching centres of the two areas concerned; if special dialling procedures are to be avoided the setting up of a call over such route would then require identification of the called exchange in full and a translation for the full identification code of six digits.

It is an object of the invention to provide translating equipment which on receiving an exchange code from a resister-sender can, in effect, decide whether to give a translation corresponding to a number of digits less than the maximum number which the code may contain—as may be required for calls between exchanges in the same area or between exchanges not directly linked in different areas—or whether to give a translation corresponding to a greater number of code digits and pertinent to, say, the setting up of a call over a direct junction extending between the calling exchange and a nearby exchange in a neighbouring switching area.

To this end translating equipment according to the present invention includes a storage device of the kind set forth having effectively defined thereon a plurality of main track addresses for the serial storage of translation information pertaining to codes requiring translation for a given number of digits thereof and a plurality of auxiliary track addresses for the serial storage of translation information pertaining to codes requiring translation for a greater number of digits, together with means for receiving a code requiring translation, main track selection means responsive to the values of the received code digits in said given number thereof for selecting a main track address containing a translation pertinent to said values of these digits, auxiliary track selection means for selecting, in response to said values being such as to indicate that the received code is one which may require translation for a greater number of digits, at least the auxiliary track containing such translation, means responsive to the values of at least the remaining digits of a code having such greater number of digits and effective, when translation for the greater number of digits is required, to select from said auxiliary track the address at which the pertinent translation is stored, and means for passing towards the translator output translation information read from that address, translation information read from the selected main track address being otherwise passed towards the translator output.

It is contemplated that the codes concerned may, as is common, be composed of decimal digits, although it will be appreciated that not all of the ten possible values of each digit may be used; for instance in a known telephone system employing the coding scheme outlined above the six digits of a full exchange code comprise three (area) digits which are figures, the second digit being always either the one or the other of only two figures, followed by three (exchange) digits of which the third is also a figure but the first two are letters, with the result that in accordance with standard practice the fourth and fifth (letter) digits of the full code have only eight possible values each.

In carrying out the invention with decimal codes, the first two digits of a received code may select one of up to a hundred main tracks and the third digit may select one of ten address sectors into which the selected track is effectively divided. For certain values of these first three digits, namely when, in the telephone coding scheme outlined above, they identify an area including exchanges to which there are direct junctions, these digits also select an auxiliary track, or group of auxiliary tracks containing translations pertinent to these exchanges.

If only one auxiliary track is selected in this way, that is if only one such track is allocated to each neighbouring area to which there are direct junctions, then translations pertinent to up to ten exchanges in any such area can be catered for, assuming that, as is contemplated will be convenient, the or each auxiliary track is effectively divided into the same number of address sectors (ten) as the main tracks. In such case, the value of one or more of the second three (exchange) digits of a received code identifying an exchange to which there is a local junction will be arranged to select from the auxiliary track as selected by the first three digits that sector which contains the pertinent translation. This translation will then be passed towards the output to be taken by the register-sender requiring the translation.

If, however, the received code identifies an exchange to which, although in a neighbouring area, no local junction is available, the values assigned to the second three digits of such code will be ineffectual to select an auxiliary track address and the translation passed towards the output will be that at the selected main track address. Likewise if the first three digits of the received code identify a remote area or an exchange in the same area (in which latter case there will be no subsequent digits) the translation sent back to the register-sender will be that from the selected main track address.

Where the calling exchange has direct junctions to more than ten exchanges in any one neighbouring area the capacity of a single auxiliary track (that is, ten address sectors) would be inadequate for the required number of translations pertinent to six-digit codes. The first three digits of the received code could then be arranged when appropriate to select a group of auxiliary tracks allocated to the area represented thereby. One of the address tracks in the group could then be selected according to the value of at least one of the remaining three digits of the code and the required address sector in that track selected by another of these three digits as before.

Since an exchange will normally only have direct junctions to exchanges in areas adjacent its own and since, moreover, these direct junctions would extend only to a few exchanges in an adjacent area, namely those nearer the common area boundary, the number of codes for which the equipment has to provide translations for six digits will be limited. Furthermore since the exchanges so linked are relatively near each other the traffic between them is likely to be heavy and translations for six code digits are therefore likely to be required on a large proportion of calls. Accordingly the provision of extra equipment to provide these translations would seem to be justified.

As with the translator described in our copending application above referred to, the translating equipment of the present invention will conveniently be adapted to operate with the translations on the storage device stored in the form of binary digits, namely having two possible values commonly represented by the numerals "0" and "1." This would require, in the case of a magnetic storage device for instance, only two states of magnetisation in which, respectively, the magnetic material is saturated in the one direction and the other, corresponding to the 0 and 1 values of each digit. With the exchange identification codes composed of decimal digits it would usually be desirable for the translations to be made available in decimal digit form also, to which end the binary digits constituting each translation may be effectively grouped so that each group represents a decimal digit. Storage of the decimal digits in this way would then preferably be in accordance with the so-called two-out-of-five code by which each decimal digit is represented by five binary digits and the ten possible values of the decimal digit are represented by different pairs of the binary digits having the value 1 or 0, the remaining three binary digits having the alternate value (that is 0 or 1) in each case. This two-out-of-five code may also be used by a register-sender for sending the decimal digit exchange code to the translator.

Each translation may be required to contain seven decimal digits and the storage device employed may be one having accommodation for up to a thousand binary digits per track, a magnetic storage drum of this capacity being commercially available. It will be apparent then that with the seven decimal digits of each translation stored in two-out-of-five binary code, there would be room on a storage device of that capacity for two complete translations in each of the ten sectoral addresses into which the main and auxiliary tracks may each be divided. Accordingly alternative translations pertinent to, say, alternative routings, may be provided for the first three digits of any exchange code, the equipment including in such circumstances means for selecting one or other of the alternative translations depending, for instance, on whether or not the route corresponding to the first translation is busy. Likewise alternative translations at least one of which is pertinent to a direct junction between exchanges in neighbouring areas and the other to an alternative route, may be provided for each code requiring translation for six digits.

Generally speaking, a complete cycle of operation of the storage device (that is, in the case of a storage drum or disc a complete revolution) will be required for reading off a translation from a main or auxiliary track and since time is also required for receiving the identification code to be translated, for selecting the address required and for sending back the translation it will usually be necessary to allow one or more cycles of operation between successive cycles on which translations are read off. This may be allowed for by providing a gating circuit which permits translation digits read off from the storage device to be passed to the register-sender only on, say, alternate cycles of operation of the device.

In order that the invention may be more fully understood reference will now be made to the accompanying drawings in which.

Figure 1:
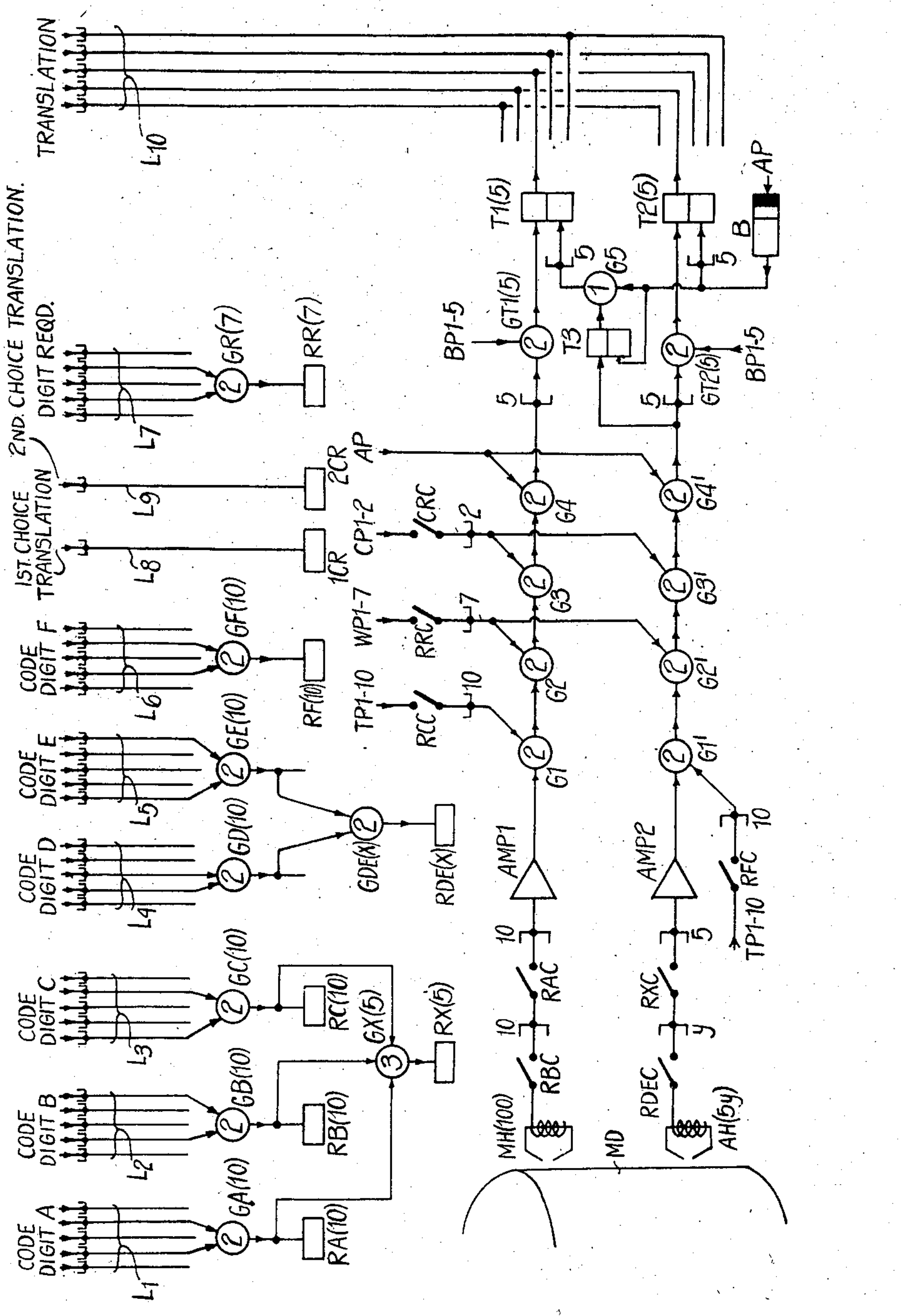
Fig. 1 is a functional diagram of one form of magnetic drum translating equipment according to the invention.
Figure 2:
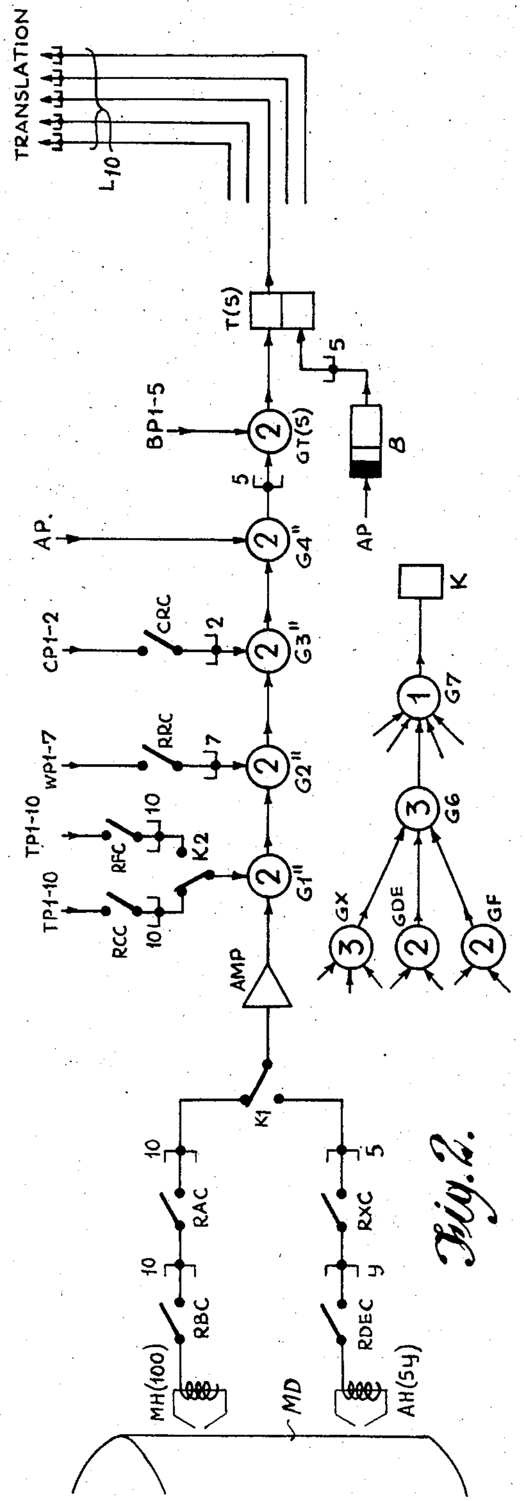
Fig. 2 is a functional diagram of a modified form of part of the equipment of Fig. 1.

In Figs. 1 and 2 various functional symbols are employed to represent gating circuits, trigger circuits and so on. Thus a gate is represented by a circle with two or more inputs leads—indicated by an arrow head directed towards the circle—and an output lead, the numeral inside the circle indicating that a signal will appear on the output lead when and only when appropriate signals are present on that number of input leads. For instance considering the gate G4 in Fig. 1, in which a pulse AP lasting for a revolution of the storage drum is applied to one input lead of the gate on alternate revolutions and pulses of given polarity (namely corresponding to "marked" binary digits read from the drum) are applied to the other input lead, pulses corresponding to those applied to this latter lead will appear on the output lead from the gate only at such times as the pulse AP is applied, the gate being said to be opened by the pulse AP to permit the passage of the output pulses. In the same way, the gate GX provides an output signal only when its three input leads simultaneously carry a signal of appropriate polarity, whereas for the gate G7 (Fig. 2) to be opened a signal need be present on only one input lead.

A two-position trigger circuit is represented by a double rectangle such as T3; an input lead to a rectangle having also an output lead extending therefrom indicates that in response to a signal on that input lead the circuit will be triggered to one stable position or state and produce an output signal, while an input lead to the other rectangle indicates that the circuit will be reset to or maintained in its initial condition by a signal applied to this last lead.

The symbol B, having a thick bar at its input end represents a timing element which provides an output pulse coincident with the beginning of an input (AP) pulse.

In order to make the operation of the translators of Figs. 1 and 2 more immediately apparent, various groups of components performing identical functions and selectively brought into effective operation have been represented only by a typical component of the group, the reference symbol for such component being followed by a bracketed numeral indicating the number of components in the group concerned: thus the gate GA(10) is one of ten such gates which are connected to the group of leads for the A code digit and control the operation of respective relays typically represented by the rectangle RA(10). Moreover where a group of similar components are connected to a common lead, only a typical member of the group is shown and a square bracket is applied to the common lead with a numeral appended to indicate the number of components in the group. The numerals referred to are replaced by lower case letters where the number of components concerned is not fixed.

The translating equipment illustrated is intended for use with the coding scheme already mentioned whereby the territory covered is divided into a number of areas each of which is represented by three decimal code digits and includes a number of exchanges also each identified by three decimal digits. An exchange is therefore fully identified by a code of six digits ABCDEF of which the ABC digits identify the exchange area and the DEF digits identify the exchange itself within that area.

Where a direct junction exists to an exchange in a neighbouring area, translation will be required for all six digits of the code identifying that exchange, as previously explained. It has been assumed for Fig. 1 that there are direct junctions to more than ten such exchanges in each of five neighbouring areas, the pertinent translations being serially stored on a magnetic storage drum MD along a number of auxiliary tracks which are effectively divided into ten address sectors each—corresponding to the ten possible values of the F digit in the six-digit codes of the exchanges concerned—and are provided on the basis of one for each different combination of A to E digits of the codes; in this way one address sector is allocated to each code requiring translation for six digits.

For calls to exchanges other than those in neighbouring areas to which there are direct junctions, translation for only three code digits is required and the pertinent translations are assumed to be serially stored on the magnetic drum along a hundred main tracks each effectively divided into ten address sectors allocated one to each three-digit code.

It is also assumed that a translation consists of seven decimal digits and that each address sector on the main and auxiliary tracks contains for the code to which it is allocated two alternative translations stored in two-out-of-five binary form, the unit storage areas for the necessary number of binary digits on each track being equally spaced along the track.

Referring to Fig. 1, an exchange code requiring translation is received from a register-sender (not shown) over six groups of leads L1 to L6 pertaining respectively to the code digits A to F. In each group of leads the value of the pertinent digit of the received code is indicated in two-out-of-five code, the register-sender to this end applying a "mark," that is a potential of given sign, to a particular combination of two leads in the group, the other leads being unmarked.

Each combination of two leads in the group L1 is connected to a gating circuit, typified by GA(10), which will be opened to produce an output signal when the two leads of the combination are marked: in this way the ten GA gates effectively convert the two-out-of-five marking on the leads of group L1 into a one-out-of-ten marking on the respective output leads of these gates. Likewise each combination of two leads in the groups L2 and L3 is connected to a gating circuit typified by GB(10) or GC(10). The GA, GB and GC gates control respective relays typified by RA(10), RB(10) and RC(10) which are energised when the corresponding gates are open. Thus in accordance with the ABC digits of a particular code received, one of the RA relays, one of the RB relays and one of the RC relays will be energised.

The energised RA relay closes its contacts RAC to select, from a hundred reading heads typified by MH(100) and respectively associated with the main tracks, a particular group of ten of these heads from which the energised RB relay, by closing its contacts RBC, selects the head associated with the main track on which a translation pertinent to the ABC digits of the received code is stored in serial form.

Figure 3:
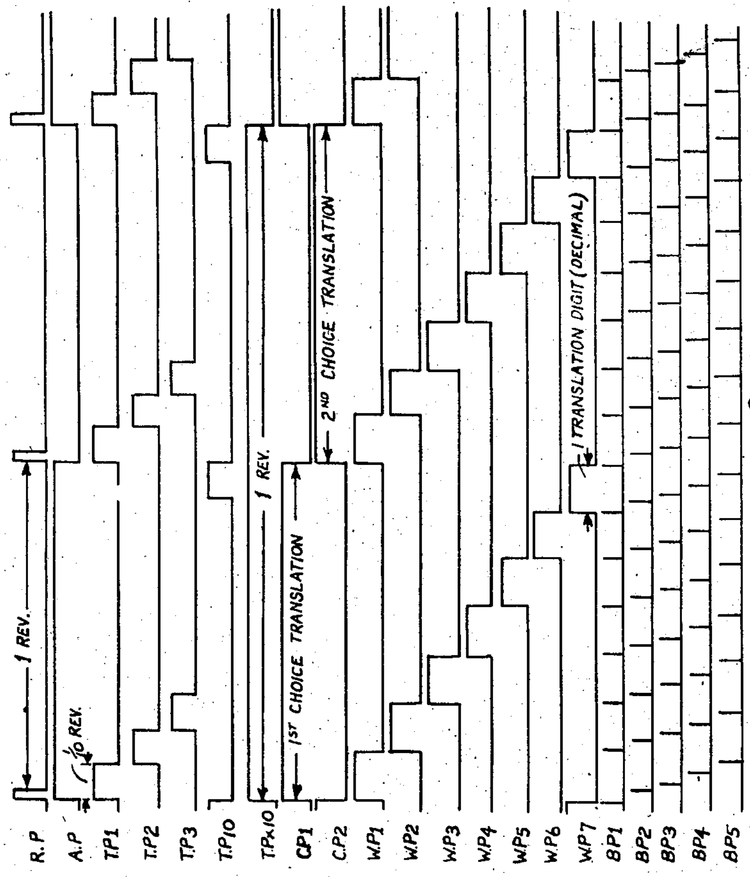
Fig. 3 illustrates the relative timing of various pulses required for the operation of Figs. 1 and 2.

As the drum MD rotates, all the binary digits stored on the main track thus selected are read off and passed to a gate G1 by way of a reading amplifier Amp1. The gate G1 has also applied to it, through the contacts RCC of the energised RC relay, one of ten pulse trains TP1 to TP10 (Fig. 3) the pulses in each of which have a repetition rate of one per revolution of the drum and a duration corresponding to a tenth of a revolution. These pulse trains, which have a relative phasing such that their pulses occur in turn, are so synchronised with the rotation of the drum that on each revolution their pulses coincide respectively with the passage past the MH reading heads of the ten address sectors into which each of the main tracks is divided. Accordingly the TP pulse selectively applied by the energised RC relay to the gate G1 opens this gate to pass to a gate G2 the binary digits stored in the corresponding sector of the selected main track, that is the binary digits constituting both of the alternative translations stored in that sector and pertinent to the ABC digits of the code received.

Register-senders commonly operate by transmitting successive pulse trains separated by significant pauses, and it is convenient for a register-sender to take a translation one decimal digit at a time during successive inter-train pauses. To this end a second group of five leads L7 is marked by the register-sender in accordance with a two-out-of-five code to indicate which of the seven decimal digits of a translation is required at any given time. Each of the seven combinations of two leads from the group L7 which may be marked in this way is connected to a gating circuit typified by GR(7). In dependence then on which two leads of the group L7 are marked one of the GR gates will be opened to cause energisation of a corresponding relay typified by RR(7).

The energised RR relay closes contacts such as RRC to apply to the gate G3 one of seven pulse trains WP1–WP7 (see Fig. 3) which are so phased and synchronised that, during the passage of each address sector past the reading head associated with the track containing that sector, the pulses from these trains coincide respectively with the passage past the head of the translation digits stored in the sector; for instance successive WP1 pulses coincide with the passage of the first digits of successive translations. The gate G2 accordingly selects from the output of the gate G1 and passes to the gate G3 those binary digits which constitute the requested translation digit (as determined by the markings on leads L7) in both translations stored at the main track address which was finally selected by the TP pulse applied to gate G1.

Depending on whether the first or second translation at the selected address is required, one or other of the leads L8 and L9 is marked to operate one of the relays 1CR and 2CR. The energised CR relay applies to the gate G3, by its contacts such as CRC, one of two pulses CP1 and CP2 coinciding respectively with the passage past the reading head of the alternative translations at each address. The gate C3 is therefore opened by the applied CP pulse to pass to a gate G4 the binary digits constituting in two-out-of-five code the requested translation digit of the chosen translation at the selected address.

On alternate revolutions of the drum MD there is also applied to the gate G4 a pulse AP which has a duration corresponding to one revolution and may be derived for instance from a revolution marking pulse RP (Fig. 3) by means of a binary counting stage (not shown). Operation of the relays having been effected during a revolution of the drum on which the AP pulse is not being applied, the gate G4 is opened by the AP pulse during the next revolution and passes the binary digits which it receives to each of five gates typified by GT1(5). These GT gates are opened cyclically in turn, at times corresponding to the occurrence of successive binary digits, by the application thereto of respective pulse trains BP1 to BP5. At two of the GT1 gates the applied BP pulses will coincide with the two marked binary digits received from the gate G4, resulting in this pair of GT1 gates producing output pulses which are applied to a corresponding pair of trigger circuits in a group of five typified by T1(5). If the ABC digits of the received code represent a remote area (or if these are the only code digits received, namely for a local call to an exchange in the same area), this pair of T1 trigger circuits will then operate and cause two of five leads L10 leading to the register-sender to be marked, thereby to indicate to the register-sender, in two-out-of-five code, the requested digit of the chosen translation pertinent to the ABC code digits received; the register-sender utilises this information on the next or a subsequent revolution of the storage drum.

If the ABC digits received identify one of the five neighbouring areas to some exchanges in which there are direct junctions, one of five relays typified by RX(5) is arranged to be operated by the opening of one of five further gates provided one for each such area and typified by GX(5). The three input leads of each GX gate are connected respectively to the output leads of those GA, GB and GC gates which will open on receipt of and in response to the combination of ABC digits identifying the area to which the GX gate pertains, the gate opening when its three input leads carry signals at the same time. As there are direct junctions to more than ten exchanges in any particular neighbouring area and the auxiliary tracks have only ten address sectors each, each such area has allocated to it a group of two or more auxiliary tracks which, on receipt of ABC code digits identifying that area, is selected by the then energised RX relay by closure of its contacts RXC.

Assuming that a received code identifies an exchange to which a direct junction exists, the DE digits of the code are used to select from the group of auxiliary tracks chosen by the RX relay the one containing the pertinent translation. To this end a number of gates typified by GDE($x$) are provided each controlling the operation of a relay typified by RDE($x$) and each connected to the output leads of two further gates taken one each from two groups typified by GD(10) and GE(10); these latter groups of gates convert the two-out-of-five markings on the leads L4 and L5 (corresponding to the D and E digits) to one-out-of-ten markings in the same manner as previously described for the GA gates. In accordance then with which one of the GDE gates is opened, that is, depending on the D and E digits of the received code, one of the RDE relays is energised and selects by its contacts RDEC one of the reading heads associated with the auxiliary tracks on the drum MD; these heads are typified in Fig. 1 by AH(5$y$), the letter $y$ representing the number of auxiliary tracks in each group.

It may be noted here that the same DE digits could be allocated to a number of exchanges, up to ten, in the same area; for instance to a number of exchanges near each other in a large city. Thus to take a specific example, if each of the five areas concerned had twenty exchanges to which there were local junctions, ten of these exchanges in each area could be allocated the same D and E digits and the other ten a different combination of D and E digits, the exchanges being differentiated from each other by the F digit in each case. The translations for the codes of these exchanges could then be contained in a group of two auxiliary tracks selected by the RX relay on receipt of the ABC digits identifying the area in question, this requiring for each such group two RDE relays permitting respective selection of the two AH reading heads associated with the auxiliary tracks in the group.

With an auxiliary track thus selected in accordance with the particular combination of A to E digits in the received code, all the binary digits read from that track pass through an amplifier Amp2 to a gate G1′. The F digit marking on the leads L6 opens as before one of ten gates typified by GF(10) which in turn operates one of ten relays typified by RF(10). The energised RF relay closes its contacts RFC to apply to the gate G1′ one of the pulse trains TP1 to TP10. The gate G1′ therefore passes the binary digits stored at the address to which the applied TP pulse corresponds, and from these digits the gates G2′ and G3′ select and pass to the gate G4′ those constituting the requested digit of the chosen translation at that address, these gates being operated similarly to the gates G2 and G3. On the revolution during which the AP pulse is applied, the gate G4′ passes the binary digits which it receives to each of five gates, typified by GT2(5), to which the BP pulse trains are also respectively applied. Two of these gates therefore open (namely those at which the applied BP pulses coincide with the marked binary digits received from the gate G4′ and cause operation of respective trigger circuits in a group of five typified by T2(5). The marked binary digits passed by the gate G4′ also operate a trigger circuit T3. This opens a gate G5 and applies to the T1 trigger circuits a resetting signal which resets any T1 trigger circuit that has been operated at this time by a marked digit read from the selected main track, and maintains the T1 trigger circuits in their unoperated condition until the trigger circuit T3 resets.

The operated T2 trigger circuits mark the L10 leads in accordance with the requested digit of the chosen translation taken from the auxiliary track, that is in accordance with the desired translation pertinent to all six digits of the received code rather than in accordance with the translation for only three digits which would have been indicated on the leads L10 by the T1 trigger circuits had the latter been allowed to operate.

The trigger circuit T3 and the operated T2 trigger circuits, or the operated T1 trigger circuits if a translation for only three digits has been passed to the register-sender from a main track, are reset by a pulse derived from a timing element B at the beginning of the next AP pulse.

Where there are only very few exchanges to which direct junctions exist, so that there are only a few exchange codes which require translation for all six digits, a modification of Fig. 1 may be used in which the receipt of such six-digit code is identified individually and operates a relay to cause a translation from an auxiliary track address, rather than from a main track address, to be sent back to the register-sender. This modification is illustrated by Fig. 2, in which the leads L1 to L10 from the register-sender and the gates and relays connected thereto have not been shown, being the same as in Fig. 1. Also the parts of Fig. 2 which have counterparts in Fig. 1 have been given the same references.

Referring to Fig. 2 and considering first the receipt of a code requiring translation for only the ABC digits, the A and B digits of the code select, by the contacts RAC and RBC as before, one of the hundred main track reading heads MH. The binary digits read by this head from the associated main track are passed through an amplifier Amp, by way of back contacts K1 on a relay K, to a gate G1″ to which the contacts RCC also apply through back contacts K2 on the relay K to TP pulse appropriate to selecting from the binary digits those constituting the alternative translations pertinent to the ABC digits of the received code. The binary digits constituting the requested translation digit of the translation chosen from these alternatives are as before passed by gates G2″ and G3″ to a gate G4″, which during an AP pulse applies these binary digits to five gates typified by GT(5). The BP pulse trains are respectively applied to the GT gates, two of which therefore open to operate two of five trigger circuits typified by T(5) and thereby mark the leads L10 in accordance with the selected translation digit.

When the received code requires translation for six digits rather than only three, the AH reading head associated with the auxiliary track containing the pertinent translation is selected as before by the RXC and RDEC contacts. On the receipt of this code on the leads L1 to L6, one of the GX gates, one of the GDE gates and one of the GF gates will be opened and will apply simultaneous signals to the input leads of a gate G6, a gate similar to G6 being provided for each of the codes requiring translation for six digits. The gate G6 then opens and in turn opens a gate G7 to operate the relay K. As a result the selected AH head is connected through front contacts K1 of this relay and through the amplifier Amp to the gate G1″, to which there is now also applied, through the contacts RFC and the front contacts K2, a TP pulse selected in accordance with the F digit, that is, corresponding to the address on the selected auxiliary track at which the required translation is stored. The gates G2″, G3″ and G4″ function as before to pass to the GT gates the binary digits constituting the requested digits of the chosen translation pertinent this time to six digits of the code, two of the GT gates and two of the T trigger circuits then operating to mark the leads L10 in accordance with this translation digit.

As will be appreciated less apparatus is required for the modification of Fig. 2 than for Fig. 1 since the same set of components Amp, G1″ to G4″, GT(5) and T(5) is used for the translations from both the main and auxiliary tracks, whereas for Fig. 1 one such set is required for the main tracks and another set for the auxiliary tracks.

It is contemplated that translating equipment in accordance with the invention may be employed in conjunction with a number of register-senders which would be connected to it in turn; the sequential connection of the register-senders could be effected by means of gating circuits opened at appropriate times by pulses from a scanning pulse generator constituted for example by some form of cyclic counter having a number of stable positions (corresponding to the number of register-senders) between which it may be stepped by the AP pulse. Since the register-senders are connected one at a time, they could use the same input leads to and output leads from the translator, this having been indicated in Figs. 1 and 2 by the square brackets applied to the leads L1 to L10.

Figure 4:
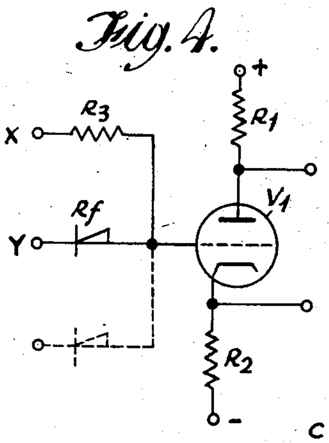
Figs. 4–6 are diagrams of suitable circuits for various components represented only by functional symbols in Figs. 1 and 2.

The gating circuits included in the arrangements of Figs. 1 and 2 may each be constituted as shown in Fig. 4. Referring to this figure, the gating circuit comprises a thermionic valve V1 having anode and cathode resistors R1 and R2. The grid of the valve is connected to a first input terminal X through a resistor R3 and to a second input terminal Y through a rectifier R*f* poled to conduct current in the direction away from the grid. The valve is normally in a non-conductive state. If a positive signal is applied to the terminal X but no signal is applied to the terminal Y, this signal will be diverted away from the grid through the rectifier R*f* and the valve will remain non-conductive. If, however, a positive signal is applied to the terminal Y at the same time as one is applied to the terminal X, the rectifier R*f* will be backed off by the signal at the Y terminal and the signal at the X terminal will then raise the grid potential of the valve, resulting in the valve becoming conductive. A negative-going output signal will then be obtained at the anode of the valve and a positive-going signal at its cathode, either of these signals being used as may be most suitable for a following circuit. Such output signal is obtained only when both the input terminals X and Y receive positive signals together. In the case of the gates GX in Fig. 1 and G6 in Fig. 2, which have to open only on coincidence of three input signals, the grid of the valve V1 would be connected to a third input terminal through a half-wave rectifier poled similarly to the rectifier R*f*, this having been indicated in dotted lines in Fig. 4.

Figure 5:
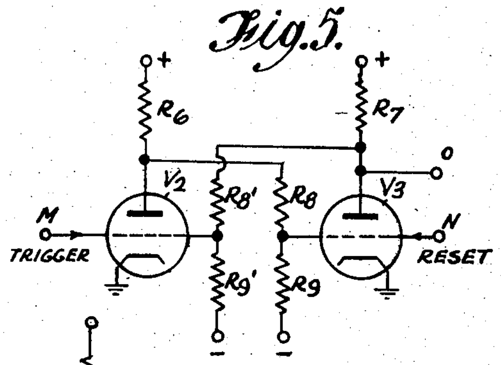

The trigger circuits may be constituted as shown in Fig. 5, in which each of two valves V2 and V3, having respective anode load resistors R6 and R7, has its anode connected through two series-connected resistors R8 and R9 or R8′ and R9′ to a source of negative bias, the junction of the series-connected resistors being connected to the control grid of the alternate valve. With the valve V2 cut off its anode is at the positive H.T. potential and biases the valve V3 to the conducting condition through the potentiometer constituted by the resistors R8, R9. Application of a positive potential to terminal M causes valve V2 to conduct so that its anode potential falls and the grid potential of valve V3 is likewise reduced to cut off the latter valve and produce a corresponding positive-going output signal at the terminal O connected to the anode. The grid of the valve V2 is then positively biased from the anode of the valve V3 through the potentiometer constituted by the resistors R8′, R9′, so that the valve V2 remains conducting even after the triggering potential has been removed from terminal M. The circuit is reset by the application of a positive potential to the terminal N, when a similar operation will be produced in reverse. Furthermore the continued application of a signal to the resetting terminal N will prevent a signal applied to the terminal M from triggering the circuit.

Figure 6:
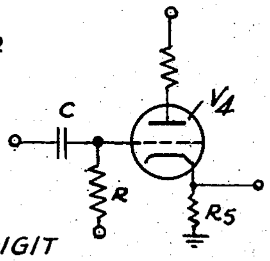

The circuit of Fig. 6 may be used for the timing element B. This circuit comprises a valve V4 to the grid number of register-senders, between which it may be stepped by the AP pulse. Since the register-senders are connected one at a time, they could use the same input leads to and output leads from the translator, this having been indicated in Figs. 1 and 2 by the square brackets applied to the leads L1 to L10.

The gating circuits included in the arrangements of Figs. 1 and 2 may each be constituted as shown in Fig. 4. Referring to this figure, the gating circuit comprises a thermionic valve V1 having anode and cathode resistors R1 and R2. The grid of the valve is connected to a first input terminal X through a resistor R3 and to a second input terminal Y through a rectifier R*f* poled to conduct current in the direction away from the grid. The valve is normally in a non-conductive state. If a positive signal is applied to the terminal X but no signal is applied to the terminal Y, this signal will be diverted away from the grid through the rectifier R*f* and the valve will remain non-conductive. If, however, a positive signal is applied to the terminal Y at the same time as one is applied to the terminal X, the rectifier R*f* will be backed off by the signal at the Y terminal and the signal at the X terminal will then raise the grid potential of the valve, resulting in the valve becoming conductive. A negative-going output signal will then be obtained at the anode of the valve and a positive-going signal at its cathode, either of these signals being used as may be most suitable for a following circuit. Such output signal is obtained only when both the input terminals X and Y receive positive signals together. In the case of the gates GX in Fig. 1 and G6 in Fig. 2, which have to open only on coincidence of three input signals, the grid transformers would be used to fulfill the function of the GX gates and RX relays, and so on.

Figure 7:
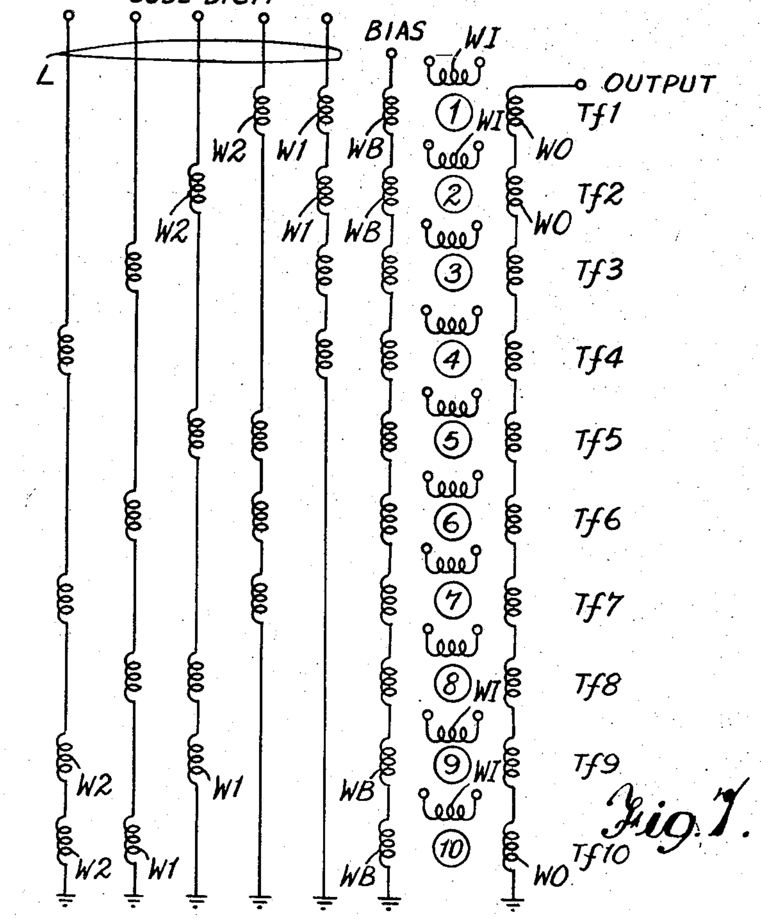
Fig. 7 illustrates a modification that may be used for reading head selection in Figs. 1 and 2.

Referring to Fig. 7 there is shown by way of example a group of ten saturable transformers T*f*1–T*f*10 which can be used, as previously indicated, for selecting one out of ten reading heads in response to and in accordance with a code digit received over a group of leads L in two-out-of-five code. Each of the transformers T*f*1–T*f*10 has a core represented by the correspondingly numbered circle, an input winding WI, two control windings W1 and W2, a bias winding WB, and an output winding WO, the output windings of the several transformers being connected in a series "chain" between earth and an Output lead, so labelled. The control windings W1 and W2 of each transformer are arranged in respective series connections between earth and two of the five leads L, the particular pair of leads L with which the control windings W1 and W2 of any transformer are associated in this way being unique to that transformer, as can be seen upon examination of the connections in Fig. 7. For serving the function of the GB gates and RB relays the input windings WI of the transformers T*f*1–T*f*10 are connected to receive the outputs from the respective reading heads of the group from which one head is to be selected. The bias windings WB of the transformers T*f*1–T*f*10 are connected in a series "chain" between earth and a source of bias potential the magnitude of which is chosen so that, in the quiescent state, the current flowing through the bias windings saturates the transformers and thereby renders ineffective the small currents received by the input windings from the respective reading heads connected to them. When two of the leads L are marked to indicate the value of a received digit, one of the transformers, and only one, has current flowing in both its control windings W1 and W2, these currents being in such sense and of such magnitude as together to completely oppose the effect of the current in the bias winding of that transformer. The core of that particular transformer is therefore brought out of saturation and current flowing in its input winding WI from the reading head connected thereto can then induce current in the output winding WO of the transformer to produce a corresponding signal on the Output lead. The circuit conditions are chosen to require that both control windings W1 and W2 of any transformer must carry current from the leads L before its core is brought out of saturation: therefore although several other transformers have current flowing in one of their control windings W1 or W2 when leads L are marked in two-out-of-five code, the cores of these other transformers remain sufficiently saturated to prevent input current in their WI windings from being effective to produce any output. Consequently the signal obtained at the Output lead will be a reproduction of the binary digits read from the magnetic drum by the reading head selected in dependence on the code digit received over the leads L.

To serve the function of the RB relays in Figs. 1 and 2, one transformer group conforming to Fig. 7 would be provided for each group of ten MH heads (requiring ten such transformer groups in all) and the input winding WI of the ten transformers in each group would be connected respectively to the ten reading heads associated with that group. Leads corresponding to the B digit leads L2 in Fig. 1 would then constitute the leads L in Fig. 7 for the several transformer groups. Preferably one and the same set of B digit leads would be used for the several transformer groups by connecting between each such lead and earth a series circuit including all those control windings (W1 and W2) which have to be energised in the several groups when that particular lead is marked.

There would thus be obtained from the ten transformer groups respective output signals each being a reproduction of the binary digits read by the particular head selected from the relevant group of heads. In order to select, in conformity with the function of the RA relays in Figs. 1 and 2, the output from one of the ten reading heads thus selected according to the B digit, the outputs from the ten transformer groups serving the function of the RB relays may then be respectively applied to the input winding WI of a further, similar transformer group in which the leads L are constituted by the leads L1 of Figs. 1 and 2 so that the output signal obtained from this last transformer group will be a reproduction of the binary digits read only by the one reading head selected according to the A digit. As an alternative, instead of the outputs from the ten transformer groups being applied to a further, similar group for selection, the output windings WO of all the transformers in said ten groups could be connected in one series chain between earth and a single output terminal and the bias windings WB then used to select from which group the output is taken, this being done by arranging that when the output from a particular group is required (as determined by the received A digit) the bias currents in the other groups is increased to such a value as to maintain saturation in all the transformers therein in spite of one transformer in each such other group having both its control windings W1 and W2 energised at this time.

Transformer arrangements similar to that of Fig. 7 and employing appropriate numbers of transformers could be used, instead of the GX and GDE gates and their associated relays, in the selection from the AH reading heads of a particular one of these heads.

What we claim is:

1. Translating equipment for providing translations of digital codes, comprising in combination: a continuously operable information storage device having effectively defined thereon a plurality of main tracks divided into addresses for the serial storage of digital translation information pertaining to codes requiring translation for a given number of digits thereof and a plurality of auxiliary tracks divided into addresses for the serial storage of translation information pertaining to codes requiring translation for a greater number of digits; a plurality of reading heads associated respectively with the main and auxiliary tracks; means for receiving a code requiring translation; main track selection means responsive to the values of the received code digits in said given number thereof for selecting a main track address containing a translation pertinent to said values of these digits; auxiliary track selection means for selecting, in response to said values being such as to indicate that the received code is one which may require translation for a greater number of digits, at least the auxiliary track containing such translation; means responsive to the values of at least the remaining digits of a code having such greater number of digits and effective, when there is a translation for the greater number of digits, to select from said auxiliary track the address at which the pertinent translation is stored; and means for passing towards the translator output translation information read from that address, translation information read from the selected main track address by the relevant main track reading head being otherwise passed towards the translator output.

2. Translating equipment as claimed in claim 1 including for the selection of a main track address selection means responsive to a first part of a received code for selecting, from the main track reading heads the head associated with the main track which includes the address concerned, and gating means governed by another part of said code for selecting from the output of the selected reading head that portion thereof corresponding to translation information stored at that address.

3. Translating equipment as claimed in claim 1 including for the selection of a main track address selection means responsive to the value of a first digit of a received code for selecting, from the main track reading heads, a group of such heads including the head associated with the main track containing the address concerned, further selection means responsive to the value of another digit of the received code for selecting the last-mentioned reading head from the selected group, and gating means governed by yet another digit of the code for selecting from the output of the selected head that portion thereof corresponding to translation information stored at said address.

4. Translating equipment as claimed in claim 1 including, for the selection of an auxiliary track address in response to a received code requiring such selection, means responsive to the combined values of at least those digits of the code which govern main track address selection for selecting from the auxiliary reading heads the head associated with the auxiliary track including the relevant address, together with means responsive to the remaining digits of the code for selecting from the output of the selected auxiliary track reading head that portion thereof which corresponds to translation information stored at said address.

5. Translating equipment as claimed in claim 1 including for the selection of an auxiliary track address in response to a received code requiring such selection, means responsive to the combined values of those code digits which govern main track address selection for selecting from the auxiliary track reading heads a group of such heads including the one associated with the auxiliary track containing the relevant address, means responsive to part of the remainder of the code for selecting the last-mentioned head from its group, and gating means governed by the finally remaining part of the code for selecting from the output of the selected auxiliary track reading head that portion thereof corresponding to translation information stored at said address thereon.

6. Translating equipment as claimed in claim 1 including means for temporarily storing translation information read from a selected main track address in the absence of an auxiliary track address, selection means for temporarily storing translation information read from a selected auxiliary track address, and means responsive to such translation information read from a selected auxiliary track for preventing the storage of translation information read from a main track address.

7. Translating equipment as claimed in claim 1 including for selecting a particular reading head from a group thereof, a selecting circuit comprising a plurality of saturable transformers, one for each head in said group, each including input winding means for receiving the output from the appertaining head, bias winding means for maintaining the transformer saturated in quiescent state, and output winding means connected in common with the output winding means of the other transformers between output terminals for the circuit, said transformers also including respective control winding means connected to be selectively energised, in accordance with the reading head to be selected, to de-saturate only the particular transformer associated with that head, whereby said transformer is rendered responsive to output from its associated reading head to provide a corresponding output at said terminals.

8. Translating equipment as claimed in claim 1 adapted to function with two or more translations stored at each address and including gating means governed according to an indicated choice of translation for a received code to select from the translation information as read from an address selected according to said code that portion of the information pertaining to the required translation.

9. Translating equipment as claimed in claim 1 including gating means functioning, in accordance with a particular translation digit indicated as being required, to select from the translation information as read from a selected address that portion thereof relating to such digit.

10. Translating equipment as claimed in claim 1 including common, selectively couplable gating means for the outputs of selected main track and auxiliary track reading heads, switching means governed by the combined values of the digits of a received code and effective to couple a selected auxiliary track reading head to said gating means in response to these digit values being such as to require auxiliary track address selection, the switching means being otherwise effective to couple a selected main track reading head to the gating means, means responsive to a first part of a received code for selecting from the main track reading heads the one associated with the main track having an address in which a translation for the code is stored, means effective when the selected main track reading head is coupled by the switching means to the gating means for causing the gating means to select from the output of the selected head, in accordance with another part of the code, that portion of said output corresponding to translation information as stored at said main track address, means effective in response to a received code requiring auxiliary track address selection to select from the auxiliary track reading heads, in accordance with the combined digit values of at least said two parts of the code, that head associated with the auxiliary track including the relevant address, and means effective when a selected auxiliary track reading head is coupled to the gating means by the switching means to cause the gating means to select from the output of that head, in accordance with the remaining digits of the code, that portion thereof which corresponds to translation information stored at said auxiliary track address.

11. Translating equipment for providing translations of digital codes, comprising, in combination: a continuously operable storage device having effectively defined thereon a plurality of main tracks divided into addresses for the serial storage of digital translation information pertaining to codes requiring translation for three digits and a plurality of auxiliary tracks divided into addresses for the serial storage of digital translation information pertaining to codes requiring translation for a greater number of digits; a plurality of reading heads associated respectively with said main and auxiliary tracks; means for receiving a code requiring translation; first selection means responsive to the value of a first of said three digits of a received code for selecting a group of main track reading heads including the head associated with the main track having an address in which a translation for the code is stored; second selection means responsive to the value of a second digit of said three digits of the code for selecting the last-mentioned main track head from the selected group; first gating means governed by the third of said three digits of the code for selecting from the output of the selected main track head that portion thereof corresponding to translation information stored at said address; third selection means responsive to the combined values of at least said three digits for selecting from the auxiliary track reading heads, when said digits have values such that there may be an auxiliary track translation for the code, the head associated with the auxiliary track including such translation, if any, at an address thereon; second gating means governed by the remainder of the code for selecting from the output of the selected auxiliary track head that portion thereof corresponding to translation information stored at said auxiliary track address; first storage means for temporarily storing the information contained in the selected portion of the output from the selected main track head, said last-mentioned means being effective only in the absence of an auxiliary track translation; second storage means for temporarily storing the information contained in the selected portion of the output from a selected auxiliary track head; means responsive to such output from an auxiliary track address for preventing storage of main track information in said first storage means in the presence of an auxiliary track translation; and means for passing towards the output of the translating equipment the information stored in whichever one of said storage means has information stored in it.

12. Translating equipment as claimed in claim 11 wherein said third selection means includes means responsive to said three digits of a received code for selecting from the auxiliary track reading heads, when said digits have values indicating that there may be an auxiliary track translation for the code, a group of heads including the one associated with the auxiliary track including such translation, if any, at an address thereon, and further means responsive to part of the remainder of the code for selecting the last-mentioned auxiliary track heading from its group, the said second gating means being governed by the finally remaining part of the code.

13. Translating equipment for providing translations of digital codes, comprising, in combination: a continuously operable storage device having effectively defined thereon a plurality of main tracks divided into addresses for the serial storage of digital translation information pertaining to codes requiring translation for three digits and a plurality of auxiliary tracks divided into addresses for the serial storage of digital translation information pertaining to codes requiring translation for a greater number of digits; a plurality of reading heads associated respectively with said main and auxiliary tracks; means for receiving a code requiring translation; first selection means responsive to the value of a first of said three digits of a received code for selecting a group of main track reading heads including the head associated with the main track having an address in which a translation for the code is stored; second selection means responsive to the value of a second digit of said three digits of the code for selecting the last-mentioned main track head from the selected group; third selection means responsive to the combined values of at least said three digits for selecting from the auxiliary track reading heads, when said digits have values such that there may be an auxiliary track translation for the code, the head associated with the auxiliary track including such translation, if any, at an address thereon; gating means; switching means governed by the combined values of the digits of the code and effective, when the code is one for which there is a translation at an auxiliary track address, for coupling the selected auxiliary track reading head to the gating means and causing the gating means to select from the output of said head, in dependence on the values of the remaining code digits, that portion thereof corresponding to translation information stored at that address, the switching means being otherwise effective to couple the selected main track head to the gating means and cause the gating means to select from the output of the selected main track head, in dependence on the value of the third of said three code digits, that portion thereof corresponding to translation information stored at the relevant main track address.

References Cited in the file of this patent

UNITED STATES PATENTS

| | | |
|---|---|---|
| 2,683,772 | Flowers | July 13, 1954 |
| 2,738,382 | Brooks et al. | Mar. 13, 1956 |
| 2,740,003 | Newby | Mar. 27, 1956 |
| 2,764,634 | Brooks et al. | Sept. 25, 1956 |